United States Patent
Lee et al.

(10) Patent No.: US 9,825,464 B2
(45) Date of Patent: Nov. 21, 2017

(54) APPARATUS FOR MANAGING ELECTRIC DEVICES

(75) Inventors: Kangmin Lee, Hwaseong-si (KR); Jihyeon Kweon, Yongin-si (KR); Seokmin Oh, Seongnam-si (KR); Hyungrae Cho, Seoul (KR); Yousef Kharsim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 808 days.

(21) Appl. No.: 13/596,691

(22) Filed: Aug. 28, 2012

(65) Prior Publication Data

US 2013/0082526 A1    Apr. 4, 2013

(30) Foreign Application Priority Data

Sep. 30, 2011    (KR) .................. 10-2011-0100224

(51) Int. Cl.
  *H02J 3/14*       (2006.01)
  *H02J 13/00*      (2006.01)
  *G06Q 50/06*      (2012.01)
  *G06Q 10/06*      (2012.01)
  (Continued)

(52) U.S. Cl.
  CPC .......... *H02J 3/14* (2013.01); *G06Q 10/06311* (2013.01); *G06Q 30/0202* (2013.01); *G06Q 50/06* (2013.01); *H02J 13/0079* (2013.01); *H02J 2003/003* (2013.01); *H02J 2003/143* (2013.01); *Y02B 70/3225* (2013.01); *Y02B 70/3266* (2013.01); *Y04S 20/222* (2013.01); *Y04S 20/242* (2013.01); *Y04S 50/14* (2013.01); *Y10T 307/406* (2015.04)

(58) Field of Classification Search
  CPC .................................................. H02J 2003/003
  USPC ............................................................ 307/31
  See application file for complete search history.

(56) References Cited

U.S. PATENT DOCUMENTS 5,572,438 A * 11/1996 Ehlers .................. G01R 21/133
                                                      307/37
6,493,643 B1 * 12/2002 Aisa .......................... H02J 3/14
                                                      307/38
(Continued)

FOREIGN PATENT DOCUMENTS

CN      102142062       8/2011
KR      20070098172     10/2007
(Continued)

OTHER PUBLICATIONS

European Search Report dated Apr. 8, 2015 issued in counterpart application No. 12836664.8-1804.
(Continued)

*Primary Examiner* — Adi Amrany
(74) *Attorney, Agent, or Firm* — The Farrell Law Firm, P.C.

(57) ABSTRACT

An apparatus and method for managing electric devices, and a mobile device and a system adapted to the method are provided. The electric device management system includes an electric power supply, a plurality of electric devices that are arranged in an area and receive electric power from the electric power supply, and a device management apparatus for providing information regarding the electric devices and at least one operation schedule of electric devices based on the entire amount of electric power planned to be consumed by the electric devices.

9 Claims, 8 Drawing Sheets

(51) Int. Cl.
*G06Q 30/02* (2012.01)
*H02J 3/00* (2006.01)

(56) References Cited

U.S. PATENT DOCUMENTS

| | | | | |
|---|---|---|---|---|
| 6,900,556 | B2* | 5/2005 | Provanzana | H02J 3/28 |
| | | | | 307/18 |
| 7,516,106 | B2* | 4/2009 | Ehlers | F24F 11/0012 |
| | | | | 705/412 |
| 7,561,977 | B2* | 7/2009 | Horst | H02J 3/14 |
| | | | | 700/295 |
| 2003/0233201 | A1* | 12/2003 | Horst | H02J 3/14 |
| | | | | 700/295 |
| 2004/0075343 | A1* | 4/2004 | Wareham | H02J 3/14 |
| | | | | 307/39 |
| 2005/0187727 | A1 | 8/2005 | Weik et al. | |
| 2006/0276938 | A1* | 12/2006 | Miller | G06Q 50/06 |
| | | | | 700/295 |
| 2007/0203860 | A1 | 8/2007 | Golden et al. | |
| 2010/0060079 | A1 | 3/2010 | MacLellan et al. | |
| 2010/0321574 | A1* | 12/2010 | Kerofsky | G06Q 50/06 |
| | | | | 348/563 |
| 2011/0153108 | A1 | 6/2011 | Yoon et al. | |
| 2011/0190953 | A1 | 8/2011 | Park et al. | |
| 2011/0231028 | A1* | 9/2011 | Ozog | G06Q 10/06 |
| | | | | 700/291 |
| 2011/0270452 | A1* | 11/2011 | Lu | G05B 19/042 |
| | | | | 700/291 |
| 2012/0109394 | A1* | 5/2012 | Takagi | G05B 15/02 |
| | | | | 700/291 |
| 2012/0153725 | A1* | 6/2012 | Grohman | H02J 3/14 |
| | | | | 307/39 |

FOREIGN PATENT DOCUMENTS

| | | |
|---|---|---|
| WO | WO 2011/029137 | 3/2011 |
| WO | WO 2011/049383 | 4/2011 |

OTHER PUBLICATIONS

European Search Report dated Feb. 19, 2016 issued in counterpart application No. 12836664.8-1804, 7 pages.
Chinese Office Action dated Jul. 1, 2016 issued in counterpart application No. 201280051672.4, 11 pages.

* cited by examiner

APPARATUS FOR MANAGING ELECTRIC DEVICES

PRIORITY

This application claims priority under 35 U.S.C. §119(a) to a Korean patent application filed on Sep. 30, 2011 in the Korean Intellectual Property Office and assigned Serial No. 10-2011-0100224, the contents of which are incorporated herein by reference.

BACKGROUND OF THE INVENTION

1. Field of the Invention

The present invention relates generally to an apparatus and method that properly supplies a plurality of electric devices with electric power according to a user's request, and to a mobile device and system adapted to the method.

2. Description of the Related Art

Electric devices operating with electric power are being used in a variety of areas, such as houses, offices, and factories. Examples of such electric devices are illumination devices, such as, fluorescent lamps, and glow lamps, temperature controlling devices, such as air-conditioners and electric-heaters, and home appliances, such as a washing machine, TV (Television) sets, computers, electric fans, and refrigerators.

Generally, a great amount of electric power is consumed by using air-conditioners in the summer and by using electric-heaters in the winter. Electricity companies may charge consumers electricity costs graded according to the use depending on seasons, in order to promote consumers to reduce the amount of electric power consumed and to increase the companies' margins. Alternatively, electricity companies apply progressive rates to the electricity cost if consumers use electricity over a preset amount in order to control the use of electricity.

However, conventional electric power saving policies are not practical because consumers do not follow the campaign policy to reduce the electric power consumption, and check the daily amount of electric power or the corresponding electric cost. Thus, there is a need in the art for a simple system to reduce the amount of electric power consumed.

SUMMARY OF THE INVENTION

The invention has been made in view of the above problems, and provides an apparatus and method that properly supplies a number of electric devices with electric power according to a user's request and to meet a user's set value in order to reduce the amount of electric power consumed. The invention further provides a mobile device and system adapted to the method.

In accordance with an embodiment of the invention, the invention provides an electric device management system including an electric power supply, a number of electric devices that are arranged in an area and received electric power from the electric power supply, and a device management apparatus for providing information regarding the electric devices and at least one operation schedule of electric devices based on the entire amount of electric power planned to be consumed by the electric devices.

In accordance with another embodiment of the invention, the invention provides an electric device management method including collecting, by a device management apparatus and/or a mobile device, information regarding a number of electric devices and the entire amount of electric power planned to be consumed by the electric devices for a period of time, wherein the device management apparatus communicates with the electric devices and the mobile device communicates with the electric devices and the device management apparatus, and producing at least one operation schedule of electric devices, based on the collected amount of electric power planned to be consumed, and outputting the operation schedules of electric devices to the device management apparatus and/or the mobile device.

In accordance with another embodiment of the invention, the invention provides a mobile device for supporting electric devices including a display unit and a controller. The display unit provides screen interface to distinguish between default electric devices and optional electric devices. The default electric devices operate with amounts of electric power corresponding to fixed values for a period of time, respectively. The optional electric devices operate with the remaining amounts of electric power subtracting the amount of electric power, consumed by the default electric devices, from the set amount of electric power planned to be consumed. The controller produces at least one operation schedule of electric devices, based on the amount of electric power planned to be consumed, according to the setting of the default electric devices and the optional electric devices.

In accordance with another embodiment of the invention, the invention provides an electric device management apparatus including a communication unit for collecting information regarding a number of electric devices consuming electric power, a device controller for producing at least one operation schedule of electric devices that defines the operations of the electric devices according to their amounts of electric power consumed and the total amount of electric power planned to be consumed by the electric devices for a preset period of time, and a device display unit for displaying at least one operation schedule.

BRIEF DESCRIPTION OF THE DRAWINGS

The above and other aspects, features and advantages of the invention will become more apparent from the following detailed description in conjunction with the accompanying drawings, in which.

DETAILED DESCRIPTION OF EMBODIMENTS OF THE INVENTION

Hereinafter, embodiments of the invention are described in detail with reference to the accompanying drawings.

Detailed descriptions of well-known functions and structures incorporated herein may be omitted for the sake of clarity and conciseness.

It is noted that the drawings are not necessarily to scale and features may be exaggerated or omitted in order to better illustrate and explain the invention. It should be understood that the invention is not limited to the embodiments.

Figure 1:
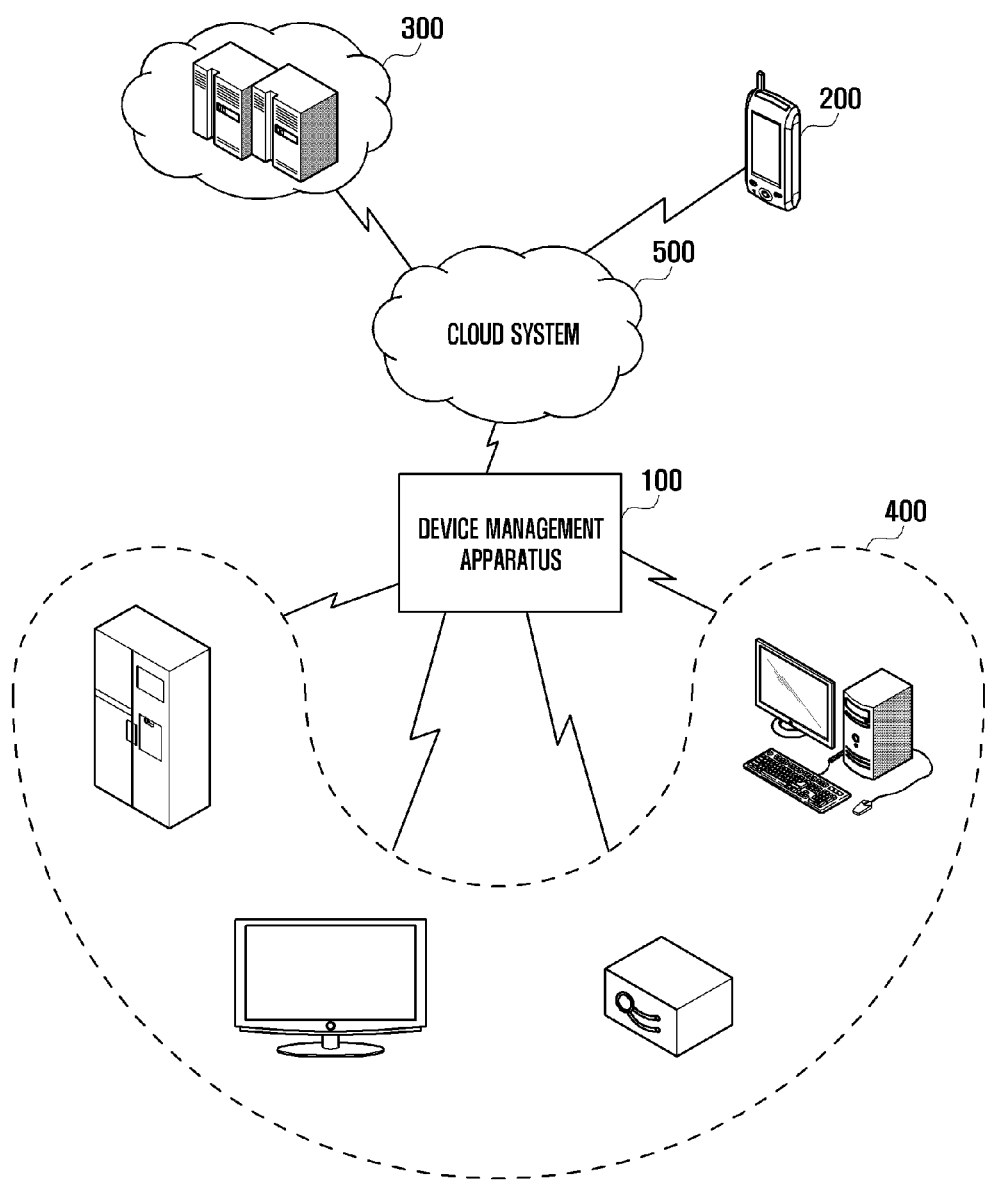
FIG. 1 illustrates a configuration of an electric device management system according to an embodiment of the invention.

FIG. 1 illustrates a configuration of an electric device management system 10 according to an embodiment of the invention.

Referring to FIG. 1, the electric device management system 10 includes a number of electric devices 400, a device management apparatus 100, an electric power supply 300, and a mobile device 200. The electric device management system 10 may further include a cloud system 500.

The electric device management system 10 performs an electric power saving function such that the device management apparatus 100 controls the use of electric power in a number of electric devices 400 according to preset device use schedule information in order to satisfy the use scheduled amount of electric power set by the user. During this process, the electric device management system 10 can operate a number of electric devices 400, according to information regarding the use of electric power by the electric devices 400, unit electricity cost, and a user's request.

The device use schedule information can be set by adjusting a number of factors regarding a number of electric devices 400, such as the use time, use environment setting, use period, and use time slots, to meet the set use schedule amount of electric power. In addition, the device use schedule information can be controlled by setting default electric devices and optional electric devices, and information regarding the priority of electric devices. The device use schedule information may also be set by other factors.

The electric device management system 10 can provide a customized electric power use mode according to a variety of environments of a use schedule amount of electric power set by the user. The electric device management system 10 can also achieve the user's set use schedule amount of electric power, and operate electric devices to practically save electric power, maintaining user convenience.

The cloud system 500 allows for communication between the electric power supply 300 and the device management apparatus 100 and between the mobile device 200 and the device management apparatus 100, and stores and manages the information via the web. The electric device management system 10 may be configured without the cloud system 500, in which case the device management apparatus 100 may be connected to the electric power supply 300 or the mobile device 200 via an additional communication unit.

Examples of the electric devices 400 are refrigerators, TV sets, washing machine, computers, and also a series of devices operated according to the device use schedule information. Electric devices 400 may be arranged in a sector where electricity can be integrally consumed, such as a house, an office, and a factory building. The electric devices 400 may use different amounts of electric power per hour according to the features. An electric device 400 may use different amounts of electric power per hour according to the operation modes. The electric devices 400 may be operated using a use amount of electric power under the control of the device management apparatus 100. Alternatively, the electric devices 400 may be operated using an amount of electric power greater or less than a preset value, according to a user's control request.

Although certain electric devices 400 are illustrated in FIG. 1, it should be understood that the invention is not limited thereto. For example, the electric devices 400 may further include an electric blanket, an electric bed, an electric fan, an audio system, an electric drier, an electric oven, and a home theater.

The electric power supply 300 supplies electric power with a number of electric devices 400 via a direct connection mode or via an indirect connection mode, i.e., the device management apparatus 100. The electric power supply 300 calculates rates according to the supplied amount of electric power and transfers the information to the device management apparatus 100, the mobile device 200 or the user. The electric power supply 300 also transmits, to the device management apparatus 100, unit cost information according to the use amount of electric power, unit cost information according to the unit use amount of electric power by time slots, and progressive rate applying information.

The device management apparatus 100 performs an electric power saving function by restricting the amount of electric power that a number of electric devices 400 will use. The device management apparatus 100 establishes communication channels with the electric devices 400 and controls their schedules to use electric power. When an amount of electric power planned to be consumed, is set, the device management apparatus 100 can provide a variety of modes within which electric devices 400 will be operated consuming the set amount of electric power, i.e., information regarding operation schedules of electric devices 400.

When the user selects one of the schedules, the electric devices 400 are operated according to the selected schedule. The device management apparatus 100 provides an amount of electric power planned to be consumed, at a period of time as a time unit, a result as to whether the amount of electric power consumed is equal to the set amount of electric power planned to be consumed. The electric device management by the device management apparatus 100 will be described in detail later herein.

The mobile device 200 communicates with the device management apparatus 100. The mobile device 200 receives information from the apparatus 100, such as the result as to whether the amount of electric power consumed is equal to a set amount of electric power planned to be consumed, and displays the information. The mobile device 200 displays, on the screen, a user interface for setting electric devices to meet an amount of electric power planned to be consumed. The mobile device 200 can also control the device management apparatus 100 to manage the electric devices. In that case, the device management apparatus 100 doesn't perform an electric device management function, and controls the electric devices 400 according to the information transmitted from the mobile device 200. The detailed operation of the mobile device 200 will be described later herein.

As described above, the electric device management system 10 controls a number of electric devices 400 to consume a user's set amount of electric power planned to be consumed, via the device management apparatus 100, thereby saving electric power.

Figure 2:
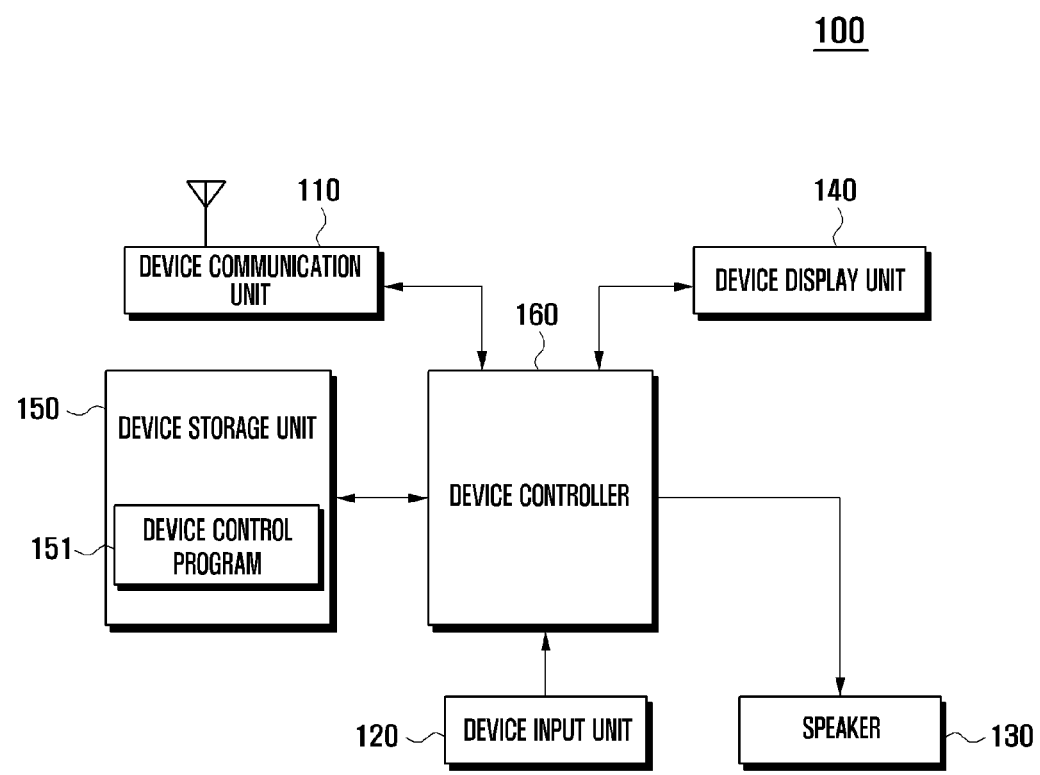
FIG. 2 illustrates a schematic block diagram of the device management apparatus shown in FIG. 1.

FIG. 2 illustrates a schematic block diagram of the device management apparatus shown in FIG. 1.

Referring to FIG. 2, the device management apparatus 100 includes a device communication unit 110, a device input unit 120, a speaker 130, a device display unit 140, a device storage unit 150, and a device controller 160.

The device management apparatus 100 establishes communication channels with a number of electric devices 400 and operates the devices according to the user's set amount of electric power planned to be consumed. During this process, the device management apparatus 100 receives, from the electric power supply 300, electricity cost-related information that includes information regarding at least one of electricity cost per hour, electricity cost by times, and progressive rate. The device management apparatus 100 controls the electric devices 400 to be operated according to the user's set amount of electric power planned to be consumed based on the received electricity cost-related information. The device management apparatus 100 provides at least one schedule that operates the electric devices 400 according to the user's set amount of electric power planned to be consumed, and then controls the electric devices 400 according to the user's selected schedule.

The device communication unit 110 establishes communication channels with a number of electric devices 400, so that the device management apparatus 100 can control the devices via the channels. The device communication unit 110 establishes communication channels with the electric power supply 300, so that the device management apparatus 100 receives electricity cost-related information from the electric power supply 300. To this end, the device communication unit 110 establishes communication channels according to at least one type of communication module or mode.

For example, the device communication unit 110 includes a wired communication modem, a wireless communication modem, and a short-range communication module. in order to establish communication channels with the electric devices 400. Alternatively, the device communication unit 110 may be configured to include a Digital Living Network Alliance (DLNA) system in order to establish communication channels with the electric devices 400. The device communication unit 110 may also include a communication modem to communicate with the electric power supply 300.

If the electric power supply 300 provides web-based electricity cost-related information, the device communication unit 110 may also employ a communication module or mode for allowing for web access. It should be understood that the device communication unit 110 is not limited to a particular communication module or mode. That is, the device communication unit 110 refers to a communication device that can establish communication channels with the electric devices 400, the electric power supply 300 and the mobile device 200.

The device input unit 120 creates input signals for operating the device management apparatus 100, according to a user's request. The device input unit 120 may be implemented with a keyboard, a keypad, or key buttons, according to the compatibility with the device management apparatus 100. If the device display unit 140 is implemented with a touch screen, the touch screen displays a touch map serving as the device input unit 120. Examples of the input signals created by the device input unit 120 are signals for supplying electric power with the device management apparatus 100, for setting an amount of electric power planned to be consumed, for selecting one of the operation schedules of the electric devices provided by the device management apparatus 100, for adjusting the selected operation schedule, and for selecting default electric devices and optional electric devices. The created input signals are transferred to the device controller 160 and serve as commands for managing the electric devices 400.

The default electric devices refer to electric devices that can consume electric power according to a user's setting or a default setting, without restriction of the amount of electric power consumed. The optional electric devices refer to electric devices in which, if an amount of electric power planned to be consumed is set, the period of time to operate and/or the amount of electric power that will be consumed, is controlled by the device management apparatus 100.

The speaker 130 outputs sound effects or guidance sounds created when the device management apparatus 100 performs control operations. The speaker 130 may output a guidance sound regarding a user's set amount of electric power planned to be consumed, according to the control of the device controller 160, at a preset time point or when an event occurs. The speaker 130 may output a guidance sound when the electric devices 400 consume the electric power, so as to meet or exceed an amount of electric power planned to be consumed, according to the control of the device controller 160.

For example, if an amount of electric power planned to be consumed is set, the device management apparatus 100: calculates amounts of electric power planned to be consumed per day, week, and month; compares daily, weekly, and monthly amounts of electric power with the calculated amounts of electric power planned to be consumed, per day, week, and month, and outputs the corresponding guidance sounds. When the user sets an amount of electric power planned to be consumed, the device management apparatus 100 provides a variety of operation schedules of electric devices to assist the user to select one of them, thereby operating the electric devices within the amount of electric power planned to be consumed.

If the user operates electric devices in a mode different from the operation schedules provided by the device management apparatus 100, the electric devices may consume electric power exceeding the set amount of electric power planned to be consumed. However, if the user stops operating the electric devices, there may not be enough electric power consumption to meet the set amount of electric power planned to be consumed, thereby leaving an unused amount of electric power from the set amount of electric power. In that case, the speaker 300 may output guidance sounds corresponding to the states according to the control of the device controller 160.

The device display unit 140 displays a variety of screen interfaces required to operate the device management apparatus 100 and also a list of electric devices 400 controlled by the device management apparatus 100. Examples of the screen interfaces are screens for selecting the electric devices 400 as default electric devices or optional electric devices, for setting the electric devices, selected as default electric devices, according to the user's preference, for setting an amount of electric power planned to be consumed, and for providing operation schedules of the electric devices to comply with the set amount of electric power planned to be consumed.

The device display unit 140 can also display the set amount of electric power planned to be consumed, or an amount of electric power currently consumed, according to the user's request. The device display unit 140 may be implemented with a touch screen. In that case, the touch screen serves also as the device input unit 120.

The device storage unit 150 stores an operating system for operating the device management apparatus 100 and application programs. The device storage unit 150 also stores a device control program 151. The device storage unit 150 stores, for example, information regarding a user's set amount of electric power planned to be consumed, information regarding operation schedules of electric devices, information regarding an operation schedule of a selected electric device, and history of electric power consumption.

The device control program 151 controls a number of electric devices 400 according to an amount of electric power planned to be consumed. The device control program 151 is loaded on the device controller 160 to support the electric power saving function. To this end, the device control program 151 includes a number of routines, such as for setting an amount of electric power planned to be consumed, providing operation schedules of electric devices according to the set amount of electric power planned to be consumed, determining whether an amount of consumed electric power is equal to the set amount of electric power planned to be consumed, by comparing the powers, outputting information regarding the determination result, and selecting electric devices as default electric devices and optional electric devices and setting the devices according to the user's preference.

The device controller 160 controls signals flowing between the components in order to support an electric power saving function. The device controller 160 also collects and displays information while executing an electric power saving function. The device controller 160 also supports a variety of functions for such functions as setting an amount of electric power planned to be consumed, operating a number of electric devices according to the set amount of electric power planned to be consumed, controlling the supply of electric power, comparing an amount of consumed electric power with the set amount of electric power planned to be consumed, and outputting guidance sounds according to the comparison result.

The device controller 160 also provides the screen interfaces, displayed on the device display unit 40, to the mobile device 200, and information regarding the amount of electric power planned to be consumed and information regarding an amount of electric power currently consumed to the mobile device 200.

Figure 3:
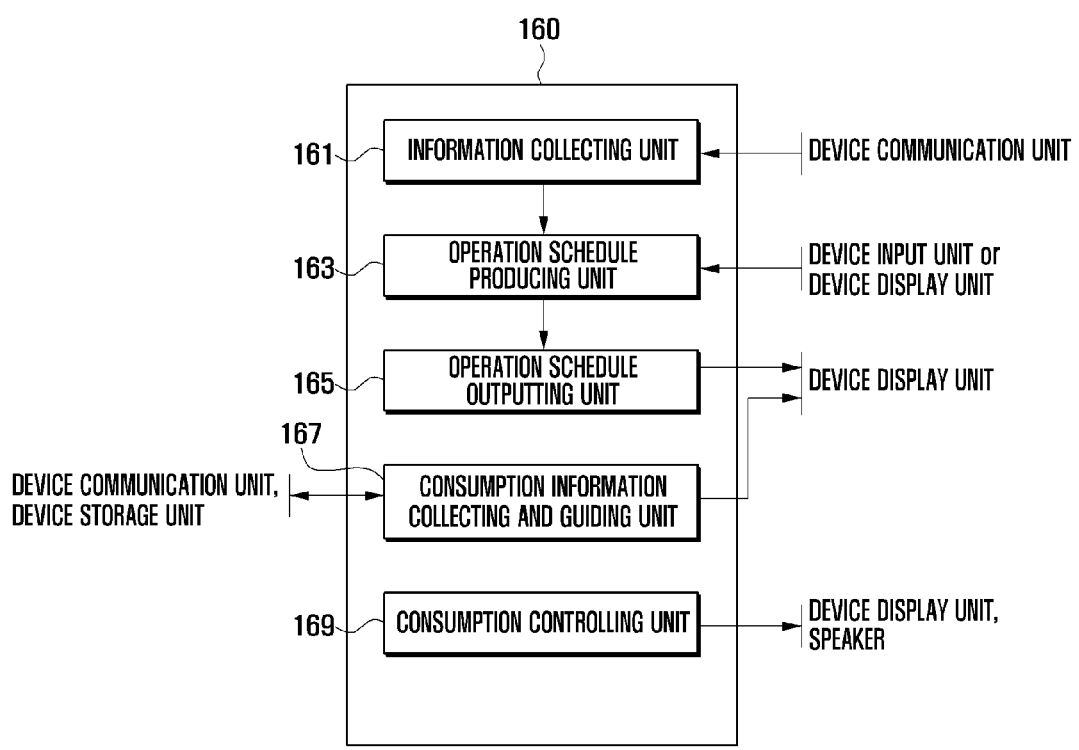
FIG. 3 illustrates a detailed view of the device controller shown in FIG. 2.

FIG. 3 illustrates a detailed view of the device controller 160 shown in FIG. 2.

Referring to FIG. 3, the device controller 160 includes an information-collecting unit 161, an operation schedule-producing unit 163, an operation schedule outputting unit 165, a consumption information-collecting and guiding unit 167, and a consumption-controlling unit 169.

The information-collecting unit 161 collects information regarding a number of electric devices 400, requests information regarding the electric devices 400 connected to the device communication unit 110, and receives the information transfers it to the operation schedule-producing unit 163. The information-collecting unit 161 collects electricity cost-related information regarding the amount of electric power consumed from the electric power supply 300, which it transfers to the operation schedule-producing unit 163.

The information-collecting unit 161 also collects an amount of electric power planned to be consumed, by providing a user interface for receiving an amount of electric power planned to be consumed. The user can input an amount of electric power planned to be consumed, to the user interface via the device input unit 120 or the device display unit 140 with a touch screen function.

The operation schedule-producing unit 163 produces a variety of operation schedules of electric devices, based on information regarding electric devices, electricity cost-related information, and an amount of electric power planned to be consumed, which are collected by the information-collecting unit 161. For example, the operation schedule-producing unit 163 can calculate costs according to the amounts of electric power consumed by electric devices 400, using the electricity cost-related information. During this process, the operation schedule-producing unit 163 can also produce operation schedules of the electric devices 400 by adjusting the amounts of electric power allocated to the electric devices 400, while the calculated cost corresponds to an amount of electric power planned to be consumed.

The operation schedule-producing unit 163 identifies the priority of importance of the electric devices 400, and adjusts the amounts of electric power to be allocated to the electric devices 400 according to the priority information. For example, the operation schedule-producing unit 163 can allocate a larger amount of electric power to an electric device with a higher priority than an electric device with a lower priority. The priority order may be set according to the user's request or the histories of electric devices consuming electric power.

If the priority order is set according to the histories of electric devices consuming electric power, the operation schedule-producing unit 163 can set an electric device with a higher priority if it has the larger operation number of times and larger consumption of electric power than the others. As the electric devices 400 may be allocated with different amounts of electric power planned to be consumed, the operation schedule-producing unit 163 can set the number of electric devices included in the device schedule information, meeting the amount of electric power planned to be consumed, and set the set electric devices according to a user's preference, in order to produce the operation schedules of electric devices.

The operation schedule-producing unit 163 classifies the electric devices 400 into default electric devices and optional electric devices, and allocates thereto the different ratios of amounts of electric power to be consumed, respectively. For example, the operation schedule-producing unit 163 allocates a fixed amount of electric power to be consumed, to the default electric devices and variable amounts of electric power to be consumed, to the optional electric devices, within the amount of electric power planned to be consumed, according to the user's selection or the operation histories of the electric devices.

The fixed, allocated amount of electric power may be set with a fixed value according to a user's request, or may be automatically set by the operation schedule-producing unit 163, based on the operation histories of electric devices. The variable, allocated amounts of electric power may be increased or decreased according to the amount of electric power planned to be consumed. Alternatively, the variable, allocated amounts of electric power may be controlled according to the total amount of electric power consumed in a period of time.

The operation schedule-producing unit 163 can produce a variety of operation schedules of electric devices with respect to a consumption schedule of an amount of electric power. For example, if the device management apparatus 100 manages five electric devices, the operation schedule-producing unit 163 allocates a portion of the amount of electric power planned to be consumed, to parts of the electric devices with relatively higher priorities, and the remaining amounts of electric power to the others.

The operation schedule-producing unit 163 provides a variety of operation schedules for the other electric devices allocated with the remaining amount of electric power, thereby operating the five electric devices within the amount of electric power planned to be consumed. If the corresponding amounts of electric power to be consumed are allocated to the electric devices, the operation schedule-producing unit 163 can produce a variety of operation schedules of electric devices using the setting values for the electric devices.

For example, if an amount of electric power allocated to an electric device, such as a TV, is varied differently from the previously allocated amount, the operation schedule-producing unit 163 can produce a variety of operation schedules of the TV, by adjusting the level of brightness. Alternatively, if an amount of electric power is altered according to the alteration of the amount of electric power planned to be consumed, the operation schedule-producing unit 163 can produce a variety of operation schedules of electric devices by automatically adjusting the values of factors such as the brightness of the light source, the operation time of washing machine, and the temperature of the air-conditioner.

Although one consumption schedule of electric power is set, the operation schedule-producing unit 163 can produce an operation schedule of electric devices for an additional amount of electric power in an allowable range of the amount of electric power planned to be consumed. For example, if an amount of electric power planned to be consumed, is set to 30,000 KRW (the Korean monetary unit), the operation schedule-producing unit 163 can produce an operation schedule of electric power for an additional amount of electric power corresponding to an additional 20,000 or 40,000 KRW. The operation schedule-producing unit 163 transfers a variety of operation schedules of electric devices to the operation schedule outputting unit 165.

The operation schedule outputting unit 165 controls the device display unit 140, for example, to display the operation schedules of electric devices with respect to an amount of electric power planned to be consumed, transmitted from the operation schedule-producing unit 163. The operation schedule-outputting unit 165 establishes a communication channel with the mobile device 200 and transmit the operation schedules of electric devices with respect to an amount of electric power planned to be consumed, via the channel. To this end, the operation schedule—outputting unit 165 collects communication information related to the mobile device 200, such as a phone number, and establishes a communication channel therewith.

The consumption information-collecting and guiding unit 167 collects information regarding amounts of electric power consumed by the respective electric devices 400, in terms of a unit of a period of time, a daily unit, a weekly unit, a monthly unit, and a yearly unit, for example. The unit 167 informs the user of the collected information, for example, via a speaker 130 outputting the guidance voice or a device display unit 140 displaying a text message. Alternatively, the unit 167 establishes a communication channel with the mobile device 200 and transmits the collected information thereto. During the output of the collected information, the unit compares the electricity cost corresponding to the amount of electric power consumed with that corresponding to the user's set amount of electric power planned to be consumed, and outputs the guidance information as to whether an amount of electric power has been properly consumed.

The consumption-controlling unit 169 receives the information regarding amounts of electric power consumed by the respective electric devices 400 from the consumption information-collecting and guiding unit 167, and compares the information with allocated amount of electric power set according to the amount of electric power planned to be consumed. If the unit 169 determines that the amount of electric power consumed is greater than the allocated amount of electric power, it performs a series of operations to reduce the amount of electric power to be consumed.

For example, the unit 169 operates an electric device according to the preset control, so that the electric device cannot consume an amount of electric power greater than the allocated amount of electric power. Examples of the preset control are an operation for controlling an air-conditioner to increase the cooling temperature, an operation for controlling an indoor heater to decrease the heating temperature, and an operation for turning off a TV or a radio. If default electric devices and optional electric devices are set to the device management apparatus 100, the unit 169 can first restrict the operations of the optional electric devices. If the electric devices are set with the priority orders, the unit 169 first restricts the electric devices, starting from the lowest priority order.

If an amount of electric power consumed until a time point is greater than an allocated amount of electric power, the consumption-controlling unit 169 further reduces the allocated amount of electric power for a period of time from the time point, and outputs a guidance message although a relatively small amount of electric power is consumed. On the contrary, if an amount of electric power consumed until a time point is less than an allocated amount of electric power, the consumption-controlling unit 169 further increases the allocated amount of electric power for a period of time from the time point, and outputs a guidance message although a relatively large amount of electric power is consumed.

These control operations are provided to process an additional operation in which the electric power saving function is not definitely operated according to the operation schedule of electric devices but instead an electric device, not included in the operation schedule of electric devices, is to be operated or an electric device, included in the operation schedule of electric devices, is to be additionally operated or where the user restricts the use of a default electric device or an electric device with a high priority order.

As described above, the device management apparatus 100 provides a variety of operation schedules of electric devices within the user's set amount of electric power planned to be consumed, outputs a guidance message to consume an amount of electric power according to an operation schedule of a selected electric device, and controls the operation of the selected electric device. Therefore, the user can practically and systematically manage the electric devices in the electric power saving mode.

Figure 4:
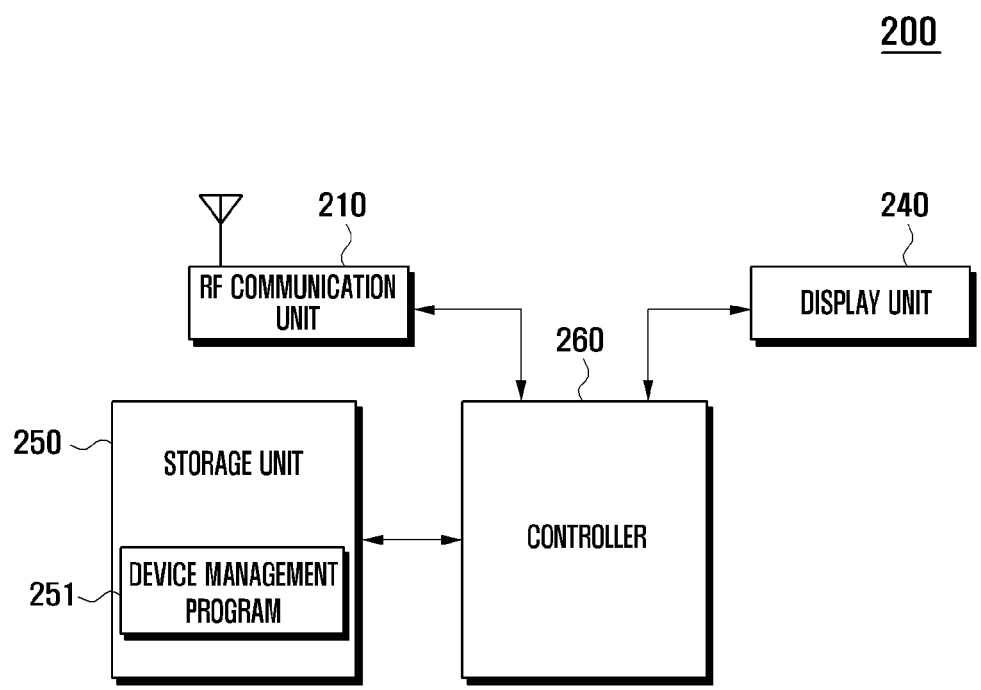
FIG. 4 illustrates a schematic block diagram of a mobile device according to an embodiment of the invention.

FIG. 4 illustrates a schematic block diagram of a mobile device according to an embodiment of the invention.

Referring to FIG. 4, the mobile device 200 includes an RF (Radio Frequency) communication unit 210, a display unit 240, a storage unit 250, and a controller 260.

The mobile device 200 communicates with the device management apparatus 100 via the RF communication unit 210, receives information related to an electric power saving function from the apparatus 100, and outputs the received information on the display unit 240. The mobile device 200 can remotely control the apparatus 100 and one or more electric devices 400 in order to execute the electric power saving function. The mobile device 200 can also serve as the apparatus 100, providing the electric power saving function described above referring to FIG. 3.

The RF communication unit 210 establishes a communication channel with the device management apparatus 100 and receives information therefrom via the channel. Examples of the information are screen interface information for setting an amount of electric power planned to be consumed, setting the priority order, selecting default electric devices and optional electric devices, setting default electric devices, selecting operation schedules of electric devices, and information regarding amounts of electric power that electric devices consume according to the selected operation schedule of electric devices, and amounts of electric power allocated to electric devices. The RF communication unit 210 transfers the received information to the controller 260. If the device management apparatus 100 serves to only supply electric power to the electric devices 400, the RF communication unit 210 establishes communication channels between the mobile device 200 and the electric devices 400.

The RF communication unit 210 performs the same function as the device communication unit 110 of the apparatus 100. The RF communication unit 210 collects information regarding the electric devices 400 and transfers it to the controller 260. The controller 260 also serves as the device management apparatus 100 according to the operation of the mobile device 200, and produces operation schedules of electric devices. To this end, the controller 260 receives electricity cost-related information from the electric power supply 300 via the RF communication unit 210.

The display unit 240 displays a variety of screens to operate the mobile device 200. The display unit 240 may be implemented with a touch screen that serves as the device display unit 140 of the apparatus 100. In that case, the display unit 240 also serves as an input device. The display unit 240 displays interface information transmitted from the apparatus 100 via the RF communication unit 210, such as for setting an amount of electric power planned to be consumed, interface for setting the priority order, selecting default electric devices and optional electric devices, setting default electric devices, selecting operation schedules of electric devices, and a screen for displaying information regarding amounts of electric power that electric devices consume according to the selected operation schedule of electric devices, and for displaying information regarding amounts of electric power allocated to electric devices.

In another embodiment, the screen interfaces listed above may be created and displayed via an application program installed in the mobile device 200, instead of being transmitted from the apparatus 100. To this end, the storage unit 250 may store a device management program 251.

The device management program 251 is similar to the device control program 151 of the device storage unit 150, and executes an electric power saving function via the mobile device 200. The device management program 251 includes a number of routines similar to the device control program 151 in order to support the electric power saving function.

The device management program 251 is designed, considering the mobility of the mobile device 200, so as to access a web server or a cloud system 500 and remotely control the electric devices 400. During this process, the device management apparatus 100, located between the mobile device 200 and the electric devices 400, serves as a gateway, so that it can receive information regarding amounts of electric power planned to be consumed via the electric devices 400 via the web or cloud system 500 and transfer the information to the electric devices 400. The storage unit 250 also stores an operating system and application programs required to operate the mobile device 200.

The controller 260 controls operations related to the electric power saving function in the mobile device 200. The controller 260 transmits, receives, and outputs the information related to the operations of the mobile device 200. For example, if the mobile device 200 provides information, transmitted from the device management apparatus 100, to the display unit 240 and transmits a user's input signal to the apparatus 100, the controller 260 receives screen interfaces and the information regarding the user's input signal via the RF communication unit 210 and displays the information on the display unit 240.

If the user selects an item or inputs setting values displayed on a corresponding screen interface, the controller 260 transfers the corresponding information to the device management apparatus 100. The controller 260 outputs, to the mobile device 200, information created while the device management apparatus 100 controls the electric devices 400 according to the amount of electric power planned to be consumed, and also transfers a user's request to the apparatus 100.

If the mobile device 200 serves as the device management apparatus 100, the controller 260 also serves as the device controller 160 as shown in FIG. 3 and outputs the screen interfaces listed above and the information to the mobile device 200. When the mobile device 200 moves from the electric devices 400 over a distance, the controller 260 enables the mobile device 200 to connect the electric devices 400 via the network, establish communication channels therewith and transmit/receive corresponding signals thereto/therefrom.

As described above, the mobile device 200 outputs information related to the operations of a number of electric devices 400 and transfers the corresponding input signals, so that the user can easily set the electric power saving mode and check the operation results. In addition, the mobile device 200 can also serve as the device management apparatus 100 and perform operations related to the electric power saving function, such as providing a variety of operation schedules of electric devices within an amount of electric power planned to be consumed, controlling the operations of the electric devices according to the selected operation schedule of electric devices, and providing information regarding amounts of electric power consumed by the electric devices and information regarding amounts of electric power allocated to the electric devices.

A detailed description is provided, in detail, regarding a screen interface output via the device display unit 140 and/or the display unit 240. In the following description, for the sake of convenience, a screen interface displayed on the display unit 240 is explained.

Figure 5:
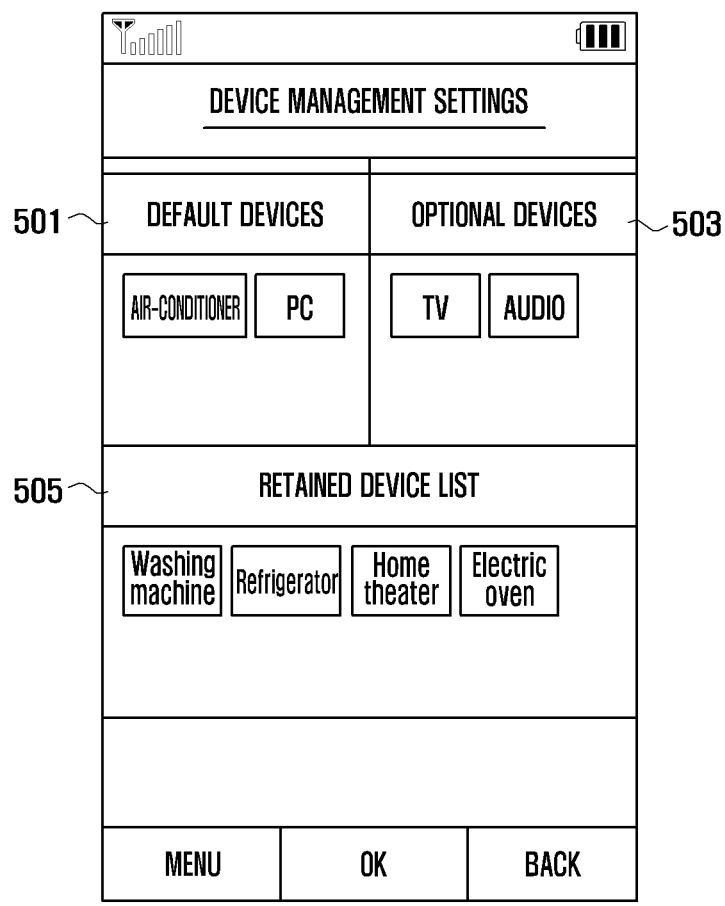
FIG. 5 illustrates a screen interface for setting default electric devices and optional electric devices, according to an embodiment of the invention.

FIG. 5 illustrates a screen interface for setting default devices and optional devices, according to an embodiment of the invention.

The user can input signals to the mobile device 200 in order to set a number of electric devices 400 as default electric devices and optional electric devices. To this end, the mobile device 200 displays a menu of items for setting electric devices 400. When the user selects a corresponding item on the menu, the mobile device 200 displays a screen interface on the display unit 240 as shown in FIG. 5. The menu includes an item 501 of default electric devices, an item 503 of optional electric devices, and an item 505 of a list of retained electric devices. To this end, the mobile device 200 directly collects information regarding the electric devices 400 via communication or receives the information via the device management apparatus 100. When the mobile device 200 acquires the information regarding the electric devices 400, it allocates indexes to corresponding electric devices, such as icons and widgets, and displays a list of retained electric devices, i.e., item 505, on a preset location on the display unit 240.

The user allocates icons corresponding to the retained electric devices in the list item 505, to the item 501 of default devices and the item 503 of optional electric devices. For example, the user allocates icons corresponding to an air-conditioner or a PC (Personal Computer), that the user often uses to the default electric device item 501. Likewise, the user can allocate icons corresponding to electric devices that the user selectively uses to the optional electric device item 503. The embodiment of FIG. 5 is implemented in such a manner that the default electric device item 501 includes an air-conditioner and a PC and the optional electric device item 503 includes a TV and an audio player.

It should be understood that the invention is not limited thereto. For example, the allocation of electric devices to default electric devices and optional electric devices may be altered according to the user's preference and the types of electric devices. Alternatively, the default electric devices and optional electric devices previously set in the mobile device may be reset according to the user's setting.

Figure 6:
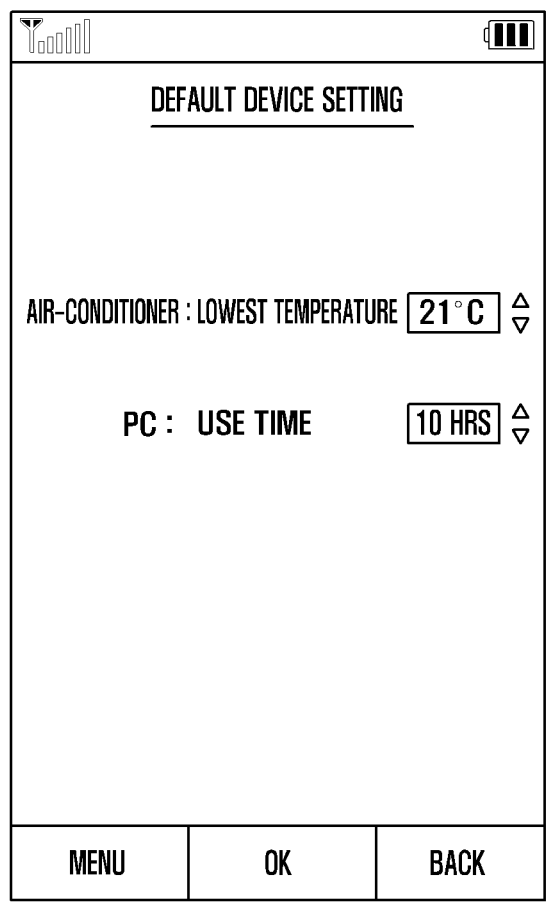
FIG. 6 illustrates a screen interface for setting the operation conditions of default electric devices, according to an embodiment of the invention.

FIG. 6 illustrates a screen interface for setting the operation conditions of default devices, according to an embodiment of the invention.

The default electric devices may be operated, irrespective of the user's set operation schedule of electric devices. When the user designates electric devices as default electric devices on the screen interface shown in FIG. 5, an additional setting for the designated default electric devices may be used. That is, the mobile device 200 displays a screen interface for setting the operation conditions of the designated default electric devices as shown in FIG. 6.

For example, if an air-conditioner and a PC are set as default electric devices, the mobile device 200 displays a screen interface for setting the operation conditions, based on the information regarding the air-conditioner and the PC, as shown in FIG. 6. That is, if an air-conditioner is set as a default electric device, the mobile device 200 displays a screen interface for adjusting the temperature. Likewise, if a PC is set as a default electric device, the mobile device 200 displays a screen interface for setting the time planned to be used. Therefore, the user can set the temperature of an air-conditioner and the time for use of a PC via the screen interface.

Figure 7:
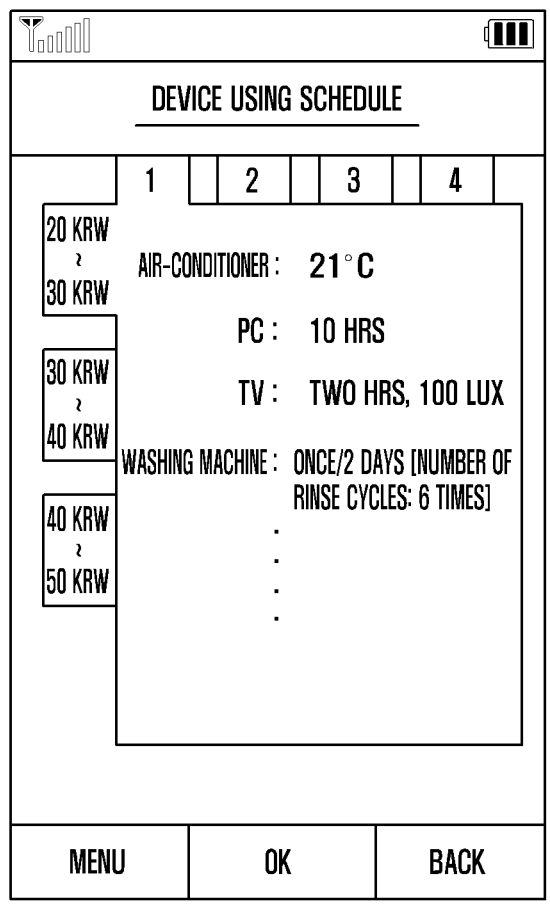
FIG. 7 illustrates a screen interface for providing operation schedules of electric devices, according to an embodiment of the invention.

FIG. 7 illustrates a screen interface for providing operation schedules of electric devices, according to an embodiment of the invention.

When the user allocates a number of electric devices 400 to default electric devices and optional electric devices via the screen interfaces shown in FIG. 5 and sets the operation conditions of electric devices selected as default electric devices 6 via the screen interface shown in FIG. 6, the mobile device 200 produces a variety of operation schedules of the electric devices. If the information regarding the allocated electric devices 400 and the setting information regarding the default electric devices is transmitted to the device management apparatus 100, the apparatus 100 produces a variety of operation schedules of the electric devices, based on the received information, and outputs the schedules to the device display unit 140 or transmits the schedules to the mobile device 200. In that case, the operation schedules of electric devices are displayed on the screen interface shown in FIG. 7.

The display unit 240 displays a variety of operation schedules of electric devices with respect to the user's set amount of electric power planned to be consumed. For example, if the user sets an amount of electric power planned to be consumed for a period of time, such as one month, to the electricity cost of 20,000~30,000 KRW (the Korean monetary unit), the device management apparatus 100 or the mobile device 200 produces the electricity cost for one month according to the setting of electric devices as default electric devices, and subtracts an electricity cost corresponding to an amount of electric power consumed from the electricity cost corresponding to the amount of electric power planned to be consumed.

Thereafter, the apparatus 100 or the mobile device 200 evenly or differently allocates the remaining amount of electric power corresponding to the remaining electricity cost to the optional electric devices, thereby producing the operation schedules of electric devices within the amount of electric power planned to be consumed. The apparatus 100 or the mobile device 200 may also allocate the remaining amount of electric power to the optional electric devices according to the priority orders or at random, thereby producing a variety of operation schedules of electric devices. The priority orders of a number of electric devices 400 may be defined according to the user's settings or automatically defined according the operation histories of the electric devices. Therefore, the display unit 240 displays operation schedules of a number of electric devices 400 for an amount of electric power planned to be consumed corresponding to the item of 20,000~30,000 KRW.

The operation schedules of a number of electric devices 400 may be further set by adjusting values in the detailed items of optional electric devices. For example, an operation schedule of a TV, i.e., TV viewing hours, may be increased or decreased by adjusting the brightness of the TV. Likewise, the entire operation number of a washing machine, serving as an operation schedule of an electric device, may be increased or decreased by increasing or decreasing the number of rinse cycles.

In addition, an operation schedule of an electric device may also be adjusted according to the alteration of an operation time zone. In particular, the device management apparatus 100 or the mobile device 200 adjusts the operation conditions of optional electric devices, thereby producing a variety of operation schedules of electric devices where the remaining amount of electric power is also properly consumed.

The device management apparatus 100 or the mobile device 200 can produce operation schedules of electric devices, considering a range of an additional amount of electric power, with respect to the user's set amount of electric power planned to be consumed. That is, the device management apparatus 100 or the mobile device 200 sets a range of additional amounts of electric power corresponding to 30,000~40,000 KRW and 30,000~40,000 KRW and produces a variety of operation schedules of optional electric devices considering the additional amounts of electric power. In that case, the display unit 240 displays the operation schedules of electric devices according to the additional amounts of electric power.

The device management apparatus 100 or the mobile device 200 adjusts the operation time zone of optional electric devices and allocates a relatively large amount of electric power thereto with relatively low cost. For example, the device management apparatus 100 or the mobile device 200 produces an operation schedule of electric devices, such as a washing machine, a rice cooker, such that it sets the washing machine or the rice cooker to operate, consuming night rates of electric power with relatively low electricity cost, thereby efficiently operating the electric devices within the user's set amount of electric power planned to be consumed.

As described above, although a variety of operation schedules of electric devices can be produced according to the user's set amount of electric power planned to be consumed, it should be understood that they can also be produced according to the types and operation conditions of default electric devices and optional electric devices, set by the user. For example, if a user sets an air-conditioner, a PC, and a heater as default electric devices and adjusts their operation conditions, the device management apparatus 100 or the mobile device 200 estimates an amount of electric power planned to be consumed by the default electric devices and the electricity cost.

After detecting the features and types of optional electric devices, designated by the user, in order to operate the optional electric devices, the device management apparatus 100 or the mobile device 200 can also estimate a range of an amount of electric power to be allocated to the optional electric devices, based on the user's setting and the operation histories of the optional electric devices. Therefore, the device management apparatus 100 or the mobile device 200 can produce a variety of operation schedules of the default electric devices and optional electric devices and display the schedules on the display unit 240.

As described above, the system for supporting an electric power saving function, the apparatus and the mobile device, according to the invention, can estimate and display electric power cost according to operation modes of a number of electric devices 400, and can also be fed back information regarding electricity costs corresponding to the amount of electric power consumed at a time point or in real time. The invention eliminates the inconvenience of a user controlling a number of electric devices on the screen interfaces described above, respectively, in order to execute an electric power saving function. The invention can integrally manage electric devices and efficiently operate them so as to meet the set amount of electric power planned to be consumed.

Figure 8:
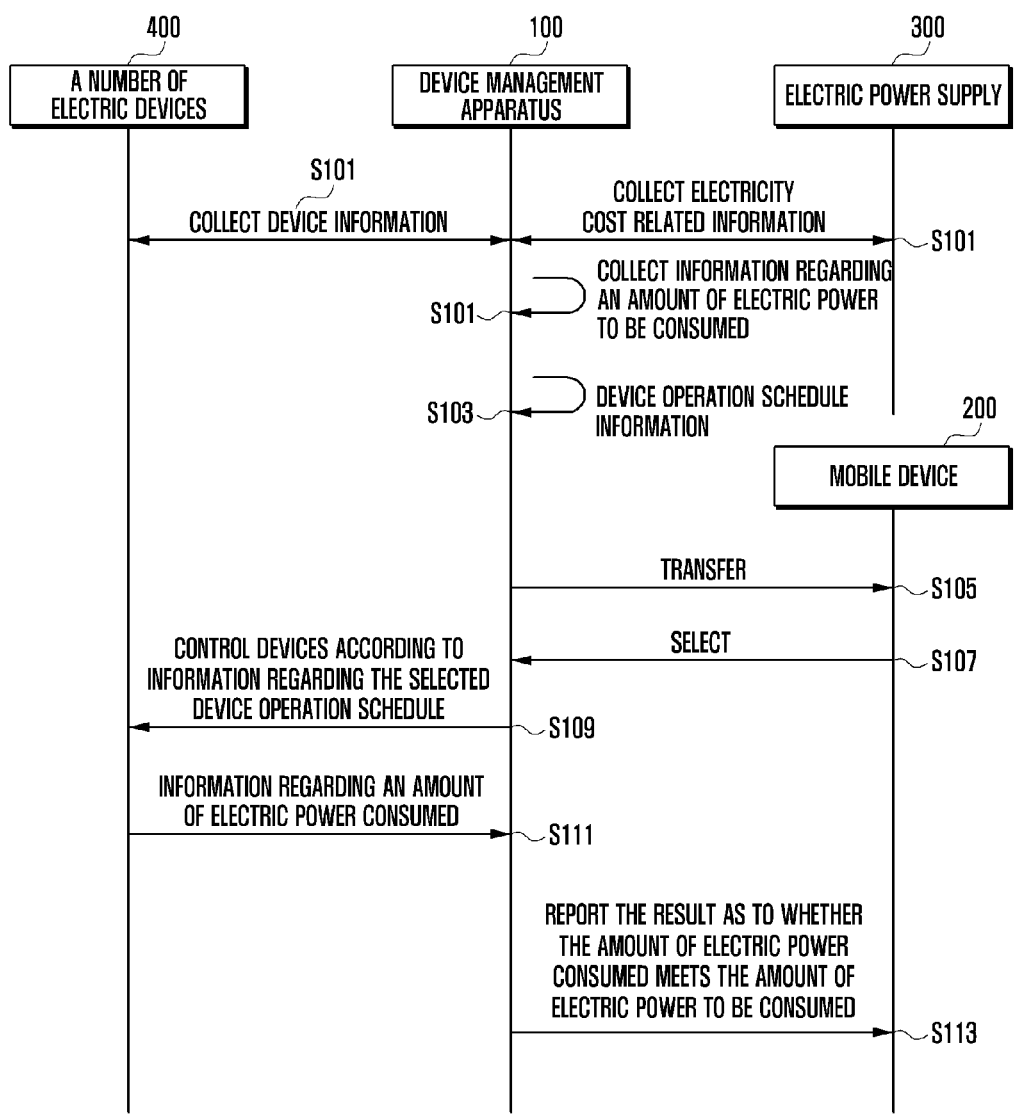
FIG. 8 illustrates an electric device management method with an electric power saving function, according to an embodiment of the invention.

FIG. 8 illustrates a flow chart that describes an electric device management method with an electric power saving function. It is assumed that the mobile device 200 displays a variety of operation schedules of electric devices and receives the user's selections. It should be, however, understood that the invention is not limited to the embodiment. That is, the embodiment may be modified such that the device management apparatus 100 displays a variety of operation schedules of electric devices and receives the user's selections.

Referring to FIG. 8, the device management apparatus 100 collects information regarding a number of electric devices 400 and regarding amounts of electric power planned to be consumed in order to produce an operation schedule of electric devices in step S101. If the device management apparatus 100 is designed to provide the operation schedule of electric devices with respect to electricity cost, it may further collect electricity cost-related information in step S101.

On the contrary, if the device management apparatus 100 is designed to provide the operation schedule of electric devices with respect to amounts of electric power allocated to the electric devices, it may not collect electricity cost-related information. The device management apparatus 100 establishes communication channels with a number of electric devices 400 and collects their information. The device management apparatus 100 collects electricity cost-related information from the electric power supply 300. The device management apparatus 100 may collect an amount of electric power planned to be consumed that the user inputs to the device display unit 140 or the device input unit 120. Alternatively, the device management apparatus 100 may receive an amount of electric power planned to be consumed from the mobile device 200.

The device management apparatus 100 produces a variety of operation schedules of electric devices based on such information as the device information, electricity cost-related information, and amount of electric power planned to be consumed, collected in step S101, in step S103. The device management apparatus 100 also collects information regarding allocated default electric devices and allocated optional electric devices, and the priority order of electric devices. The device management apparatus 100 can produce operation schedules of electric devices such that amounts of electric power are evenly or differently allocated to the electric devices, respectively, based on the device allocation information and/or the priority order information.

After that, the device management apparatus 100 transmits the produced operation schedules of electric devices to the mobile device 200 in step S105. The mobile device 200 displays the received operation schedules so that the user can select one of the schedules. When the user selects an operation schedule of electric devices, the mobile device 200 transmits the information to the device management apparatus 100 in step S107, which controls the electric devices 400 based on the user's selected operation schedule in step S109.

While the electric devices 400 are operated, the device management apparatus 100 collects information regarding their amounts of electric power consumed and determines whether the collected amounts of electric power meet a preset amount of electric power planned to be consumed in step S111. The device management apparatus 100 may transmit a message regarding the determination result to the mobile device 200 in step S113, which outputs the received message so that the user can detect the state regarding the amount of electric power currently consumed.

In another embodiment, when the electric device management system 10 supports the cloud system 500, the device management apparatus 100 can transmit, to the cloud system 500, device information, an amount of electric power planned to be consumed, electricity cost-related information, a variety of operation schedules of electric devices, control state information regarding electric devices according to a selected operation schedule of electric devices, information regarding an amount of electric power consumed, and a message regarding a determination as to whether an amount of electric power is equal to an amount of electric power planned to be consumed by a preset time period unit.

When the mobile device 200 is connected to the cloud system 500, the system 10 allows the mobile device 200 to select and set information related to the electric power saving function, based on the information provided by the device management apparatus 100. In that case, the mobile device 200 can serve as the device management apparatus 100 that provides information to the cloud system 500. That is, the mobile device 200 can collect information listed above, produce operation schedules of electric devices, select one of the operation schedules, and collect information related to the control of electric devices and the amount of electric power consumed. The mobile device 200 provides the collected information to the cloud system 500, in which case the device management apparatus 100 is connected to the cloud system 500, receives the information transmitted from the mobile device 200, and outputs corresponding information.

As described above, the invention can properly supply a number of electric devices with electric power to meet a user's set value, thereby practically reducing the amount of electric power consumed.

Although it is not shown in the drawings, the mobile device may selectively further include various types of components, such as a short-range communication module for short-range communication, an interface for transmitting/receiving data in a wireless or wired mode, an Internet communication module, and a digital broadcast module for receiving and reproducing broadcasts.

With the proliferation of digital convergence, it will be easily appreciated to those skilled in the art that the other components equivalent to the above-listed components may be further included to the mobile device according to the invention. Also, it will be appreciated that, according to the purposes, the mobile device may be implemented by omitting a particular component or replacing it with other components.

The mobile device according to the invention includes all information communication devices, multimedia devices, and their applications, which collect audio signals via the microphone and are operated according to communication protocols corresponding to various types of communication systems. For example, the mobile device can be applied to mobile communication terminals, Portable Multimedia Players (PMPs), digital broadcast players, Personal Digital Assistants (PDAs), audio players (such as MP3 (Motion Pictures Experts Group-Layer Audio 3) players), mobile game players, smart phones, laptop computers, and handheld PC.

Although embodiments of the invention have been described in detail hereinabove, it should be understood that many variations and modifications of the basic inventive concept herein described, which may be apparent to those skilled in the art, will still fall within the spirit and scope of the embodiments of the invention as defined in the appended claims and their equivalents.

What is claimed is:

1. An electronic device comprising:
a communication unit;
a display; and
a controller configured to:
control the communication unit to receive first information regarding amounts of electric energy consumed by external electronic devices during a first preset period of time and second information regarding a total amount of electric energy set as a total amount of electric energy available for all of the external electronic devices to consume during a second preset period of time;
generate, based on the first information and the second information, a plurality of alternative operation schedules for operating the external electronic devices within the total amount of electric energy available for all of the external electronic devices to consume during the second preset period of time,
control the display to display on a screen the plurality of alternative operation schedules,
receive a selection, from a user of the electronic device, of one of the plurality of alternative operation schedules, and
control the external electronic devices to operate according to the selected alternative operation schedule, for the second preset period of time.

2. The device of claim 1, wherein the communication unit receives electricity cost-related information from an electric power supply, and provides the electricity cost-related information to the controller.

3. The device of claim 2, wherein the controller produces the alternative operation schedules based on the electricity cost-related information.

4. The device of claim 1, wherein the controller identifies priority orders of the external electronic devices and allocates amounts of electric energy to the external electronic devices according to the priority orders.

5. The device of claim 1, wherein the controller:
determines the second information based on a setting of each of the external electronic devices regarding a classification of the external electronic devices,
wherein each of the plurality of alternative operation schedules is generated based on the classification of the external electronic devices,
wherein the external electronic devices are classified into the default external electronic devices and the optional external electronic devices, and
wherein the default external electronic devices operate with a fixed amount of electric energy during the second preset period of time and the optional external electronic devices operate with a remaining amount of electric energy during the second preset period of time,
wherein the remaining amount of electric energy is calculated by subtracting the fixed amount of electric energy from the total amount of electric energy available for all of the external electronic devices to consume.

6. The device of claim 5, wherein the controller identifies preset priority orders of the optional external electronic devices and allocates the remaining amount of electric energy to the optional external electronic devices.

7. The device of claim 5 wherein the controller is further configured to:
identify amounts of electric energy consumed by the external electronic devices during a specific time,
modify the selected alternative operation schedule when a total of the identified amounts of electric energy is more than an amount of electric energy that the external electronic devices operating according to the selected alternative operation schedule are planned to consume during the specific time, wherein modifying the selected alternative operation schedule is performed by changing an amount of electric energy allocated to the optional external electronic devices, and
control the external electronic devices to operate according to the modified alternative operation schedule during a remaining time of the second preset period of time.

8. The device of claim 1, further comprising:
an input unit and/or a display unit serving as the input unit for receiving the second information, including the second preset period of time.

9. The device of claim 1, wherein the controller provides a mobile device with the plurality of alternative operation schedules, information regarding amounts of electric energy consumed by the external electronic devices at a time point, and information regarding a determination result as to whether a total of the amounts of electric energy consumed by the external electronic devices, according to the selected alternative operation schedule, is equal to the total amount of electric energy available for all of the external electronic devices to consume.

* * * * *